(12) United States Patent
Dorfi et al.

(10) Patent No.: US 9,827,724 B2
(45) Date of Patent: Nov. 28, 2017

(54) TIRE STRUCTURE FOR EXTERNALLY MOUNTED DEVICE

(71) Applicant: Bridgestone Americas Tire Operations, LLC, Nashville, TN (US)

(72) Inventors: Hans R. Dorfi, Akron, OH (US); Kevin Scheifele, Atwater, OH (US); Terence Eugene Wei, Copley, OH (US); Paul Wilson, Tallmadge, OH (US); Andrew Miklic, Akron, OH (US)

(73) Assignee: BRIDGESTONE AMERICAS TIRE OPERATIONS, LLC, Nashville, TN (US)

( * ) Notice: Subject to any disclaimer, the term of this patent is extended or adjusted under 35 U.S.C. 154(b) by 868 days.

(21) Appl. No.: 14/028,699

(22) Filed: Sep. 17, 2013

(65) Prior Publication Data

US 2015/0075693 A1    Mar. 19, 2015

(51) Int. Cl.
| | | |
|---|---|---|
| *B60C 13/02* | (2006.01) | |
| *B60C 23/00* | (2006.01) | |
| *B60C 23/04* | (2006.01) | |
| *B29D 30/00* | (2006.01) | |

(Continued)

(52) U.S. Cl.
CPC ........ *B29D 30/0061* (2013.01); *B60C 13/001* (2013.01); *B60C 13/04* (2013.01); *B60C 23/00* (2013.01); *B60C 23/0433* (2013.01); *B29D 2030/0072* (2013.01); *B29D 2030/0077* (2013.01); *B60C 23/0447* (2013.01); *Y10T 152/10495* (2015.01); *Y10T 156/10* (2015.01)

(58) Field of Classification Search
CPC ......... B60C 23/00; B60C 23/02; B60C 23/04; B60C 23/0408; B60C 23/041; B60C 23/0413; B60C 23/0422; B60C 23/0433; B60C 23/0447; B60C 23/0491; B60C 23/0493; B60C 23/06; B60C 13/00; B60C 13/002; B60C 13/02
See application file for complete search history.

(56) References Cited

U.S. PATENT DOCUMENTS

| | | | | |
|---|---|---|---|---|
| 1,458,629 | A | * | 6/1923 | Raymond ............... B60C 13/02 152/523 |
| 4,851,809 | A | * | 7/1989 | McAlister ........... B60C 23/0493 116/34 A |
| 6,386,251 | B1 | | 5/2002 | Koch |

(Continued)

FOREIGN PATENT DOCUMENTS

| | | |
|---|---|---|
| CN | 200988401 | 12/2007 |
| CN | 201532645 | 7/2010 |

(Continued)

OTHER PUBLICATIONS

Machine translation of JP 2013-107460, 2013.*

(Continued)

*Primary Examiner* — Justin Fischer
(74) *Attorney, Agent, or Firm* — Bridgestone Americas Tire Operations, LLC (57) ABSTRACT

A method of mounting an object on a tire includes providing a tire having a sidewall, wherein the sidewall includes a mounting portion configured to receive an object. The method further includes mounting the object on the mounting portion of the sidewall, such that the object is visible without extending outwardly beyond the mounting portion.

8 Claims, 11 Drawing Sheets

(51) Int. Cl.
*B60C 13/00* (2006.01)
*B60C 13/04* (2006.01)

(56) References Cited

U.S. PATENT DOCUMENTS

| | | | |
|---|---|---|---|
| 6,581,657 | B1 | 6/2003 | Brown |
| 6,666,079 | B2 | 12/2003 | Poulbot et al. |
| 6,798,140 | B2 | 9/2004 | Reim et al. |
| 7,292,138 | B2 * | 11/2007 | Jang .................. B60C 23/0493 340/426.33 |
| 7,348,878 | B2 | 3/2008 | Fogelstrom |
| 7,513,144 | B2 | 4/2009 | Miyoshi |
| 7,668,669 | B2 | 2/2010 | Miyoshi |
| 7,926,527 | B2 * | 4/2011 | Kleckner .................. B60C 9/18 152/152.1 |
| 8,025,238 | B2 | 9/2011 | Jung et al. |
| 8,566,042 | B2 | 10/2013 | Wang et al. |
| 8,593,357 | B2 | 11/2013 | Myatt |
| 2004/0095244 | A1 | 5/2004 | Conwell et al. |
| 2005/0076982 | A1 | 4/2005 | Metcalf et al. |
| 2006/0000533 | A1 | 1/2006 | Hendrie |
| 2007/0097698 | A1 | 5/2007 | Song et al. |
| 2010/0123584 | A1 | 5/2010 | Lionetti et al. |
| 2013/0126063 | A1 | 5/2013 | Landers et al. |

FOREIGN PATENT DOCUMENTS

| | | | |
|---|---|---|---|
| DE | 4429216 | | 2/1996 |
| JP | 59165180 | * | 9/1984 |
| JP | 8-99508 | * | 4/1996 |
| JP | 2004090775 | | 3/2004 |
| JP | 2006062345 | | 3/2006 |
| JP | 2007504057 | | 3/2007 |
| JP | 2009196192 | | 9/2009 |
| JP | 2012161939 | | 8/2012 |
| JP | 5027549 | | 9/2012 |
| JP | 2012250592 | | 12/2012 |
| JP | 2013107460 | * | 6/2013 |
| JP | 2013107634 | | 6/2013 |
| WO | 2004068769 | | 8/2004 |
| WO | 2006012942 | | 9/2006 |
| WO | 2013006562 | | 1/2013 |

OTHER PUBLICATIONS

International Search Report and Written Opinion; Corresponding PCT Application No. PCT/US2014/049004; Authorized Officer Commissioner; dated Nov. 12, 2014.
Machine Translation of JP 59-165180 (Sep. 18, 1984) cited by Examiner in Office Action dated Oct. 19, 2016.
Notice for Reasons of Rejection; Corresponding Japanese Application No. 2016-541969; Authorized Officer Commissioner; dated Apr. 27, 2017.
Partial Search Report; Corresponding European Application No. 14845260.0; Authorized Officer Commissioner; dated May 9, 2017.
Office Action (and translation); Corresponding Korean Application No. 10-2016-7007043; Authorized Officer Commissioner; dated Apr. 27, 2017.

* cited by examiner

FIG. 8A     FIG. 8B

TIRE STRUCTURE FOR EXTERNALLY MOUNTED DEVICE

FIELD OF INVENTION

The present disclosure relates to the field of attaching an object to a tire. More particularly, the present disclosure relates to tire structure for externally mounting an object to the tire.

BACKGROUND

It is sometimes desirable to attach an object to a tire. For example, it may be desirable to attach an electronic device package, such as a radio device, to a tire. In one such embodiment, the radio device is a radio frequency identification (RFID) tag or chip to a tire. Such a device package may be embedded in the sidewall or other location of a tire, such that the chip is not visible to an observer. Alternatively, a device package may be attached to an external or internal surface of the tire. In one known embodiment, the device package is attached to an external surface of a sidewall using an adhesive.

SUMMARY OF THE INVENTION

In one embodiment, a tire has a circumferential tread and a pair of beads, including a first bead and a second bead. The tire further includes a pair of sidewalls, including a first sidewall extending from the first bead to the circumferential tread, and a second sidewall extending from the second bead to the circumferential tread. A tire electronic device package is mounted to an external side of the first sidewall, at a location between the first bead and the circumferential tread. The tire electronic device package is exposed, such that the tire electronic device package is visible. A distance from an equatorial plane of the tire to a point on the sidewall proximate to the tire electronic device package is at least as great as a distance from the equatorial plane of the tire to a point on an external surface of the tire electronic device package.

In another embodiment, a tire mold includes a circumferential tread forming portion and a pair of sidewall forming portions. One of the sidewall forming portions includes a segment configured to receive an object. The tire mold further includes means for retaining the object against the segment such that at least a portion of the object is disposed inward from at least a portion of the segment configured to receive the object.

In yet another embodiment, a method of mounting an object on a tire includes providing a tire having a sidewall, wherein the sidewall includes a mounting portion configured to receive an object. The method further includes mounting the object on the mounting portion of the sidewall, such that the object is visible without extending outwardly beyond the mounting portion.

In still another embodiment, a method of mounting an object on a tire includes providing a green tire having a sidewall and mounting the object on an external surface of the sidewall, such that the object is visible. The method further includes curing the green tire and the object together.

BRIEF DESCRIPTION OF THE DRAWINGS

In the accompanying drawings, structures are illustrated that, together with the detailed description provided below, describe exemplary embodiments of the claimed invention.

Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions. Where the definitions include a reference to a tire, it should be understood to also reference a tire mold.

"Axial" or "axially" refer to a direction that is parallel to the axis of rotation of a tire.

"Bead" refers to the part of the tire that contacts the wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
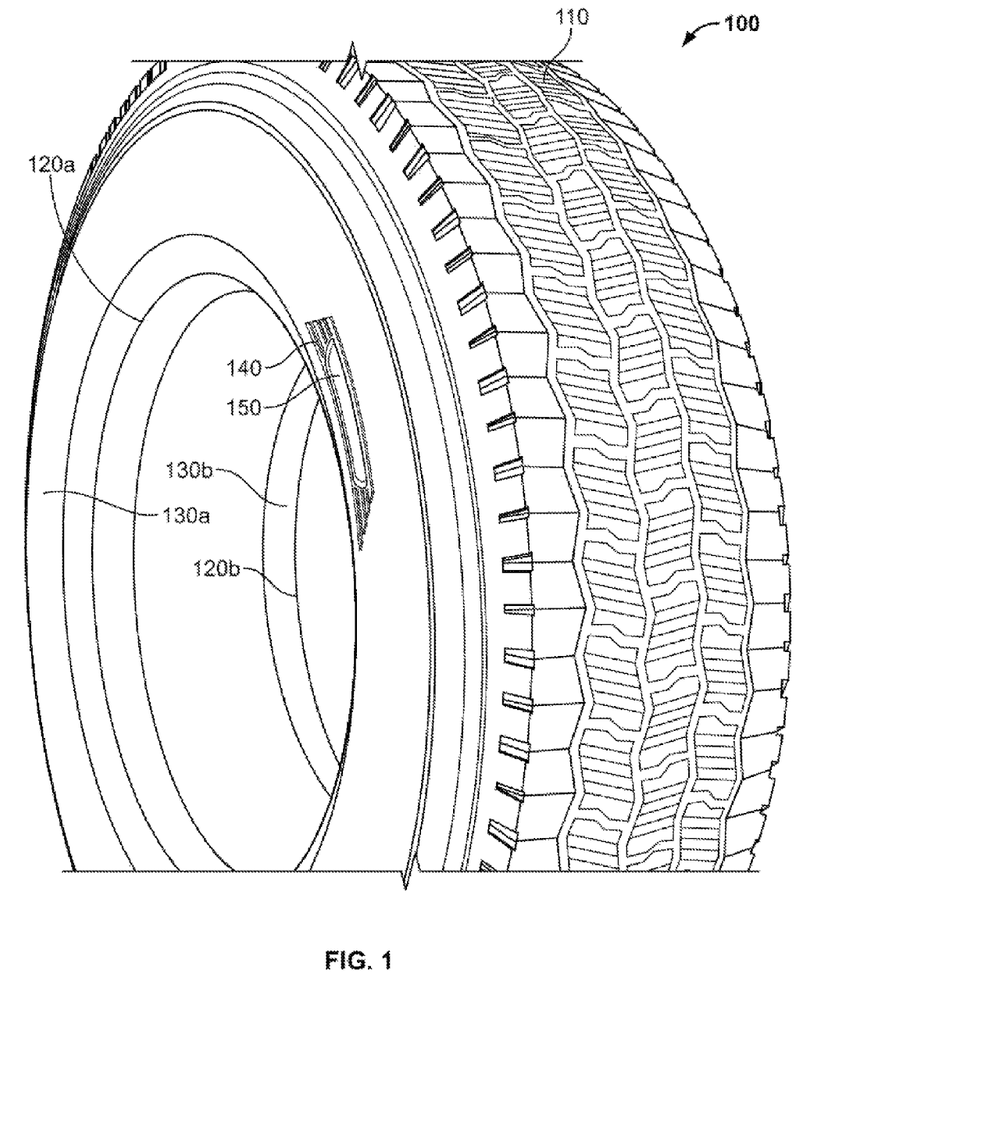
FIG. 1 is a perspective view of one embodiment of a tire 100 having external geometry configured for receiving an object.

FIG. 1 illustrates a perspective view of one embodiment of a tire 100. The tire 100 has a circumferential tread 110 and a pair of beads 120, including a first bead 120a and a second bead 120b. A first sidewall 130a extends from the first bead 120a to the circumferential tread 110, and a second sidewall 130b extends from the second bead 120b to the circumferential tread 110.

The first sidewall 130a includes external geometry configured for receiving an object. In the illustrated embodiment, the external geometry is a rib 140 having a geometric shape that surrounds a flat portion 150. In an alternative embodiment (not shown), the rib only partially surrounds the flat portion. While the rib is shown as a substantially oval (or stadium) shape, having a plurality of circumferentially extending wings, it should be understood that any geometric shape may be employed.

Figure 2A:
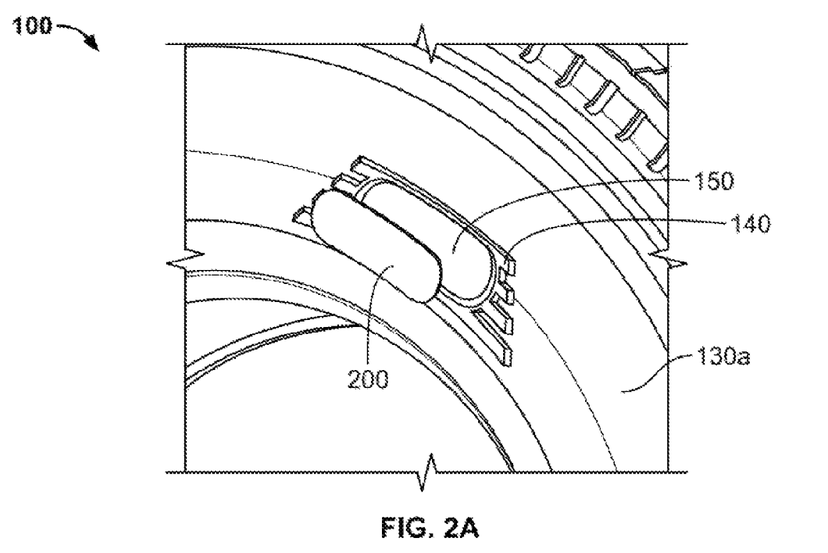
FIGS. 2A-B are partial perspective views of the tire 100 receiving an object.
Figure 2B:
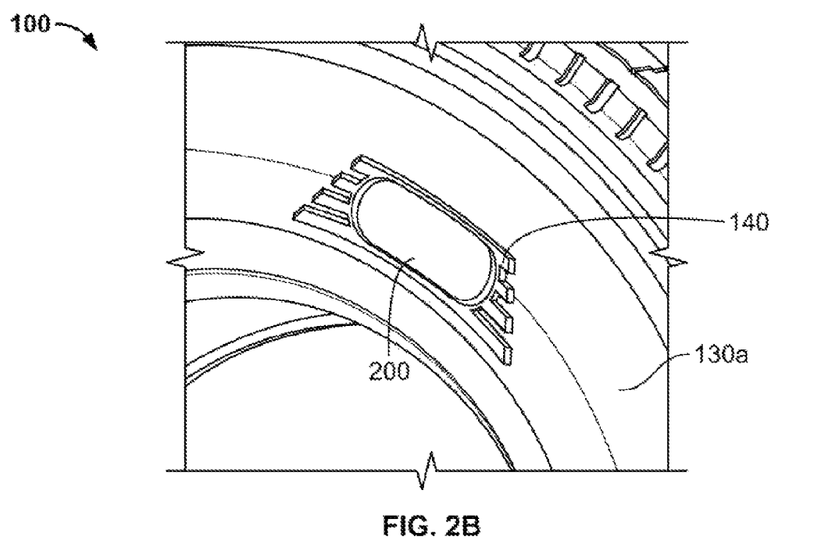

FIGS. 2A and 2B illustrate partial perspective views of the tire 100 receiving an object 200. As can be seen from these figures, the object 200 is mounted in the flat portion 150 such that it is proximate to the rib 140.

The object 200 may be any object. In one known embodiment, the object conveys information, such as through a visual indication, or through a bar code or other readable representation of data. In another known embodiment, the object is a tire electronic device such as an RFID chip or a sensor. The tire electronic device may be embedded in a polymeric material. An embedded electronic device may be referred to as a "tire electronic device package." In one embodiment, the tire electronic device is embedded in rubber. In one specific embodiment, the tire electronic device is embedded in rubber having a substantially similar composition as the sidewall of the tire. However, it should be understood that a tire electronic device package need not include embedding material.

As can be seen in FIG. 2B, when the object 200 is mounted on the first sidewall 130a in the flat portion 150, the object 200 is exposed such that it is visible to an observer. However, it should be understood that in the case where the object 200 is a tire electronic device package that includes rubber that is substantially similar to the sidewall rubber, the object may not be immediately discernible as different from the surrounding sidewall, even though the object is visible.

Figure 2C:
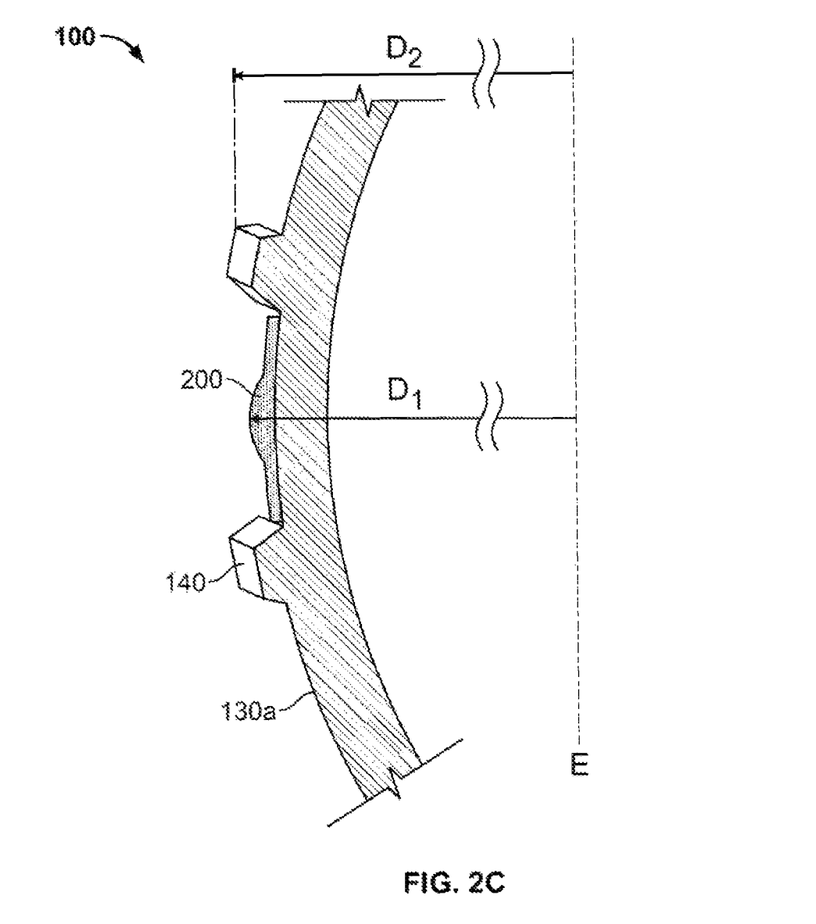
FIG. 2C is a partial side view of the tire 100.

FIG. 2C illustrates a partial side view of the tire 100. As can be seen from this view, in the illustrated embodiment, the rib 140 extends axially outward, beyond an outermost point of the object 200. In other words, the outermost point of the object 200 is a distance $D_1$ from an equatorial plane E of the tire 100, an outer surface of the rib 140 is a distance $D_2$ from the equatorial plane E of the tire 100, and $D_1<D_2$. In an alternative embodiment (not shown), the rib extends axially outward, beyond at least a portion of the object. In another alternative embodiment (not shown), the rib is flush with an outer surface of the object. In yet another alternative embodiment (not shown), the object protrudes beyond the rib.

Figure 3A:
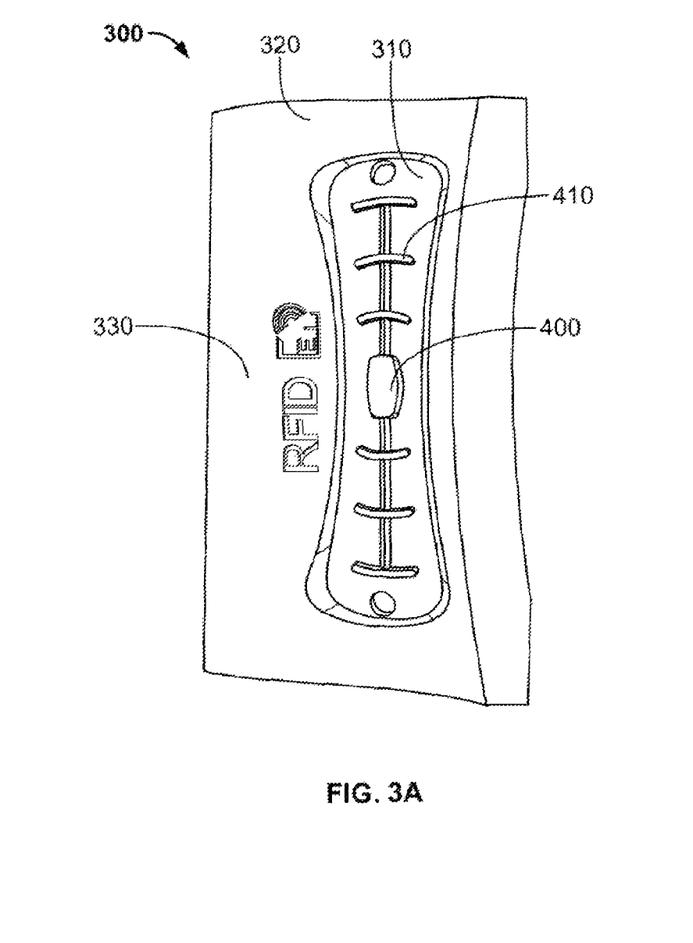
FIG. 3A is a partial front view of an alternative embodiment of a tire having a recess for receiving an object.
Figure 3B:
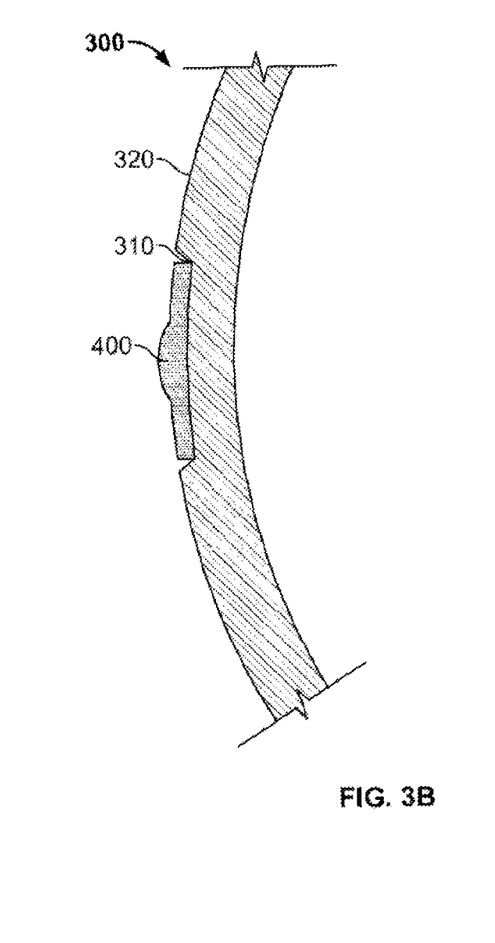
FIGS. 3B-D are schematic drawings of partial cross sections of other alternative embodiments of a tire having a recess for receiving an object.
Figure 3C:
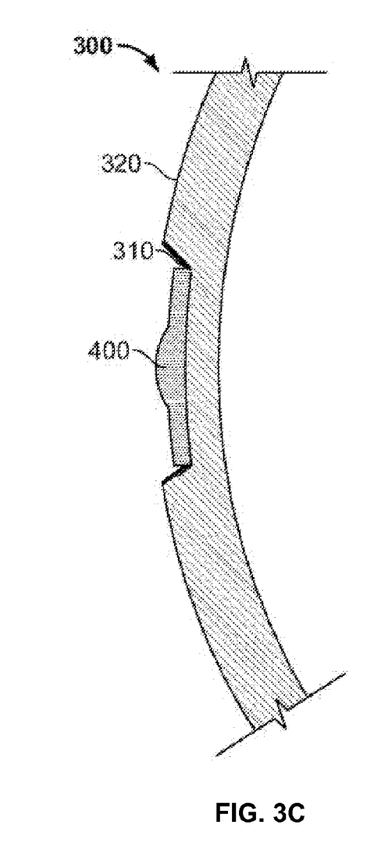
Figure 3D:
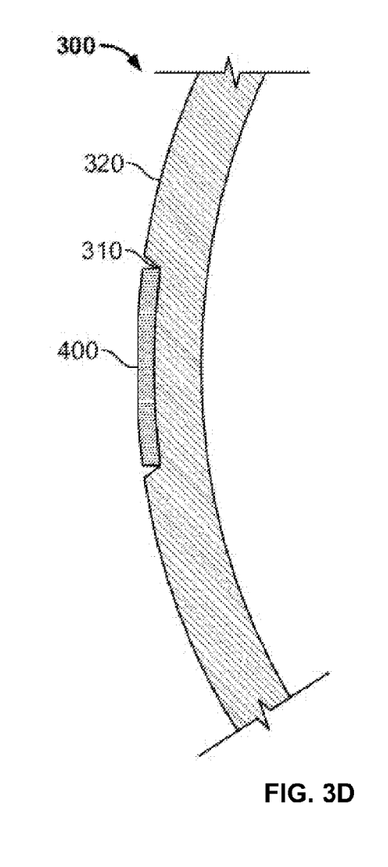

FIG. 3A illustrates a partial front view of an alternative embodiment of a tire 300 having a recess for receiving an object 400. Additionally, FIGS. 3B-D are schematic drawings of partial cross sections of other alternative embodiments of a tire having a recess for receiving an object. While FIGS. 3A and 3B-D are not meant to be views of the same tire, they should be understood to illustrate similar features of the same concept.

In the illustrated embodiment, the tire 300 includes a recess 310 in a sidewall 320. The recess 310 has a shape configured to receive the object 400. In the illustrated embodiment, both the recess 310 and the object 400 have a substantially dog bone shape. However, it should be understood that the recess and the object may have any geometric shape. It should also be understood that the shape of the object need not be the same as the shape of the recess.

In one embodiment, shown in FIG. 3B, the object 400 is received in the recess 310 such that the sidewall 320 is flush with a portion of an outer surface of the object, while a portion of the object 400 protrudes beyond the sidewall 320. In another embodiment, shown in FIG. 3C, the object 400 is received in the recess 310 such that a portion of the sidewall proximate to the object 400 extends beyond the object. In other words, a distance from an equatorial plane of the tire 300 to a point on the object 400 is less than a distance from the equatorial plane of the tire 300 to a point on the sidewall 320 proximate to the object 400. In yet another embodiment, shown in FIG. 3D, the object 400 is completely flush with the sidewall 320. It should be understood that various portions of the object may be flush, recessed, or protrude from the sidewall of the tire.

Like the embodiment shown in FIGS. 1 and 2, the object 400 may be any object, and may convey information through visual indication, a bar code, or other readable representation of data. The object 400 may also be a tire electronic device package and include an RFID chip or a sensor. In the illustrated embodiment, the object 400 includes indicia 410 to indicate the purpose of the object to a user. The sidewall 320 of the tire 300 also includes indicia 330 to further indicate the purpose of the object to a user. In the illustrated example, both the object indicia 410 and the sidewall indicia 330 include symbols and/or lettering to indicate that the object includes an RFID tag, thereby informing the user where an RFID reader should be placed to obtain information. Additionally, or in the alternative, indicia may be employed to indicate communication information, such as the RF frequency, the RF protocol, the data format, or other information about the RFID tag. It should be understood that different indicia may be employed for other purposes.

In the illustrated embodiment, when the object 400 is mounted on the sidewall 320, the object 400 is exposed such that it is visible to an observer. However, it should be understood that in the case where the object 400 is a tire electronic device package that includes rubber that is substantially similar to the sidewall rubber, the object may not be immediately discernible as different from the surrounding sidewall, even though the object is visible.

Figure 4A:
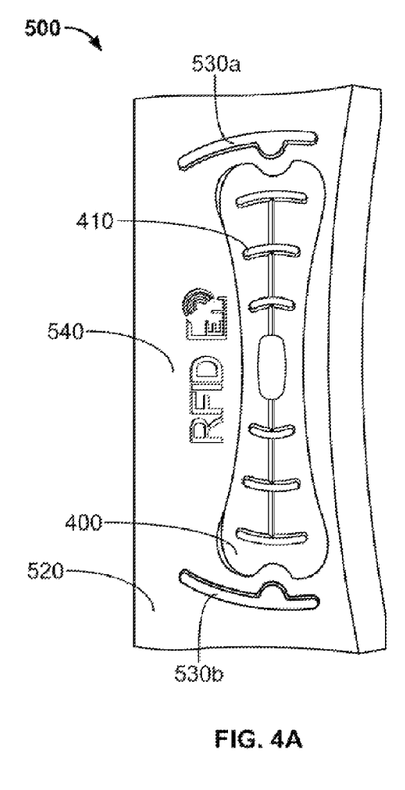
FIG. 4A is a partial front view of an alternative embodiment of a tire having a pair of external ribs and a recess for receiving an object.
Figure 4B:
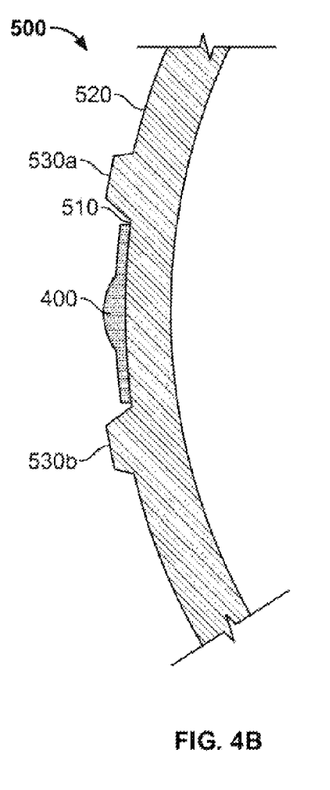
FIGS. 4B-D are schematic drawings of partial cross sections of other alternative embodiments of a tire having a pair of external ribs and a recess for receiving an object.
Figure 4C:
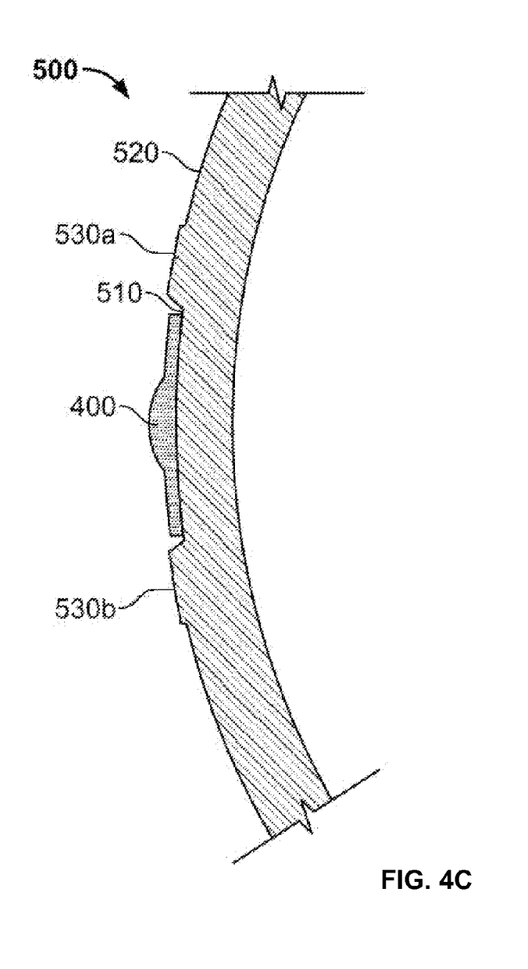
Figure 4D:
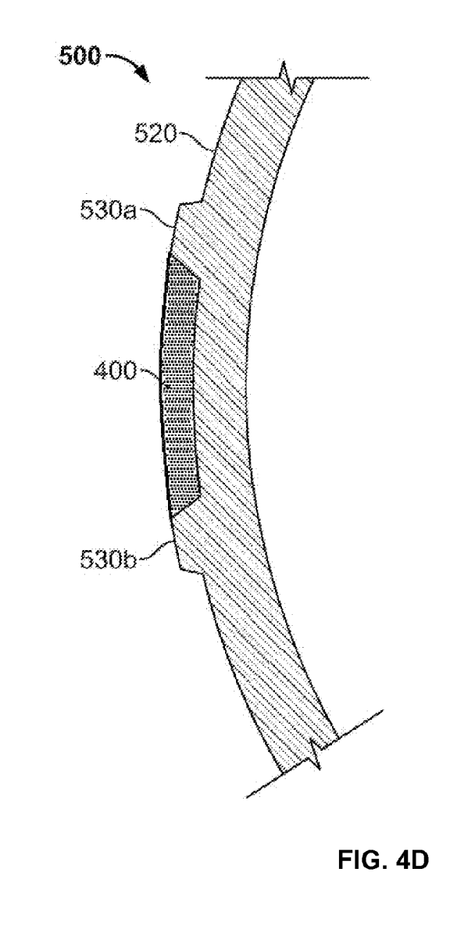

FIG. 4A illustrates a partial front view of an alternative embodiment of a tire 500 having a recess 510 for receiving an object 400 in a sidewall 520, as well as a pair of external ribs 530. FIG. 4B is a schematic drawing of a partial cross section of another alternative embodiment of a tire 500 having a recess 510 for receiving an object 400, as well as a pair of external ribs 530.

In the illustrated embodiment, the tire 500 includes a recess 510 in a sidewall 520. The recess 510 has a shape configured to receive the object 400. In the illustrated embodiment, both the recess 510 and the object 400 have a substantially dog bone shape. However, it should be understood that the recess and the object may have any geometric shape. It should also be understood that the shape of the object need not be the same as the shape of the recess.

Additionally, a pair of ribs 530 are disposed proximate to the recess 510, and are therefore proximate to the object 400. The pair of ribs 530 includes a first rib 530a proximate to a first side of the recess 510 and a second rib 530b proximate to a second side of the recess 510 opposite the first side of the recess. The ribs 530 extend outward beyond at least a portion of the object 400. In other words, a distance from an equatorial plane of the tire 500 to a point on the object 400 is less than a distance from the equatorial plane of the tire 500 to a point on the ribs 530. In an alternative embodiment (not shown), the ribs are flush with an outer surface of the object. In yet another alternative embodiment (not shown), the object protrudes beyond the ribs.

In the illustrated embodiment, the object 400 includes indicia 410 to indicate the purpose of the object to a user. The sidewall 520 of the tire 500 also includes indicia 540 to further indicate the purpose of the object to a user. In the illustrated example, both the object indicia 410 and the sidewall indicia 540 include symbols and/or lettering to indicate that the object includes an RFID chip, thereby informing the user where an RFID reader should be placed to obtain information. It should be understood that different indicia may be employed to indicate this, or other purposes.

In the illustrated embodiment, when the object 400 is mounted on the sidewall 520, the object 400 is exposed such that it is visible to an observer. However, it should be understood that in the case where the object 400 is a tire electronic device package that includes rubber that is substantially similar to the sidewall rubber, the object may not be immediately discernible as different from the surrounding sidewall, even though the object is visible. Indeed, if the object includes rubber, and is cured at the same time as the tire, the rubber of the object and the rubber of the sidewall may flow together such that there is no visible boundary between the object and the sidewall. Such an object may include an electronic device embedded therein. The object may still be said to be visible even if it the rubber of the object is indistinguishable from the rubber of the sidewall, and even if the embedded device is not visible.

In each of the above described embodiments shown in FIGS. 1-4, the object may be mounted on the sidewall using one of a number of different methods. In one embodiment, the tire is a cured tire, and the object is mounted in the recess or between the ribs using an adhesive, such as a solvent based adhesive, a polymer dispersion adhesive, a pressure sensitive adhesive, a contact adhesive, a thermoplastic, or a reactive adhesive. In another alternative embodiment, the object is press fit between the geometric ribs or the side walls of the recess.

Figure 5A:
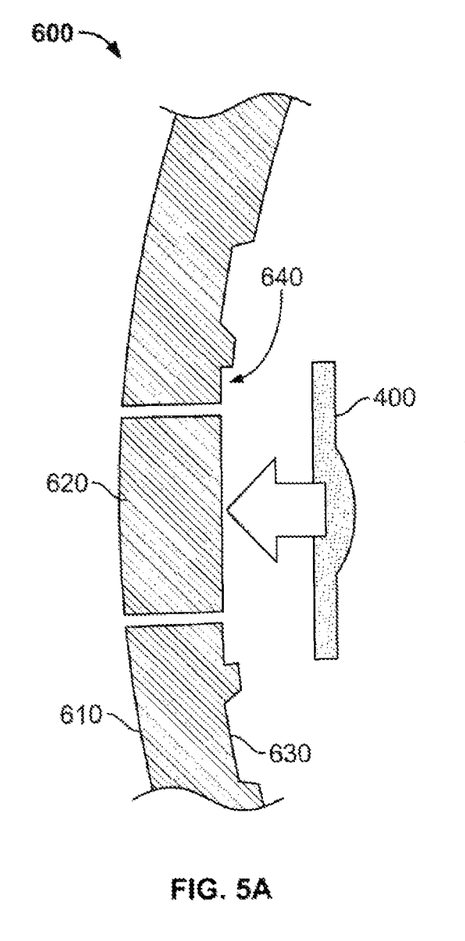
FIG. 5A is a partial side view of one embodiment of a tire mold 600 having internal geometry configured for receiving an object.
Figure 5B:
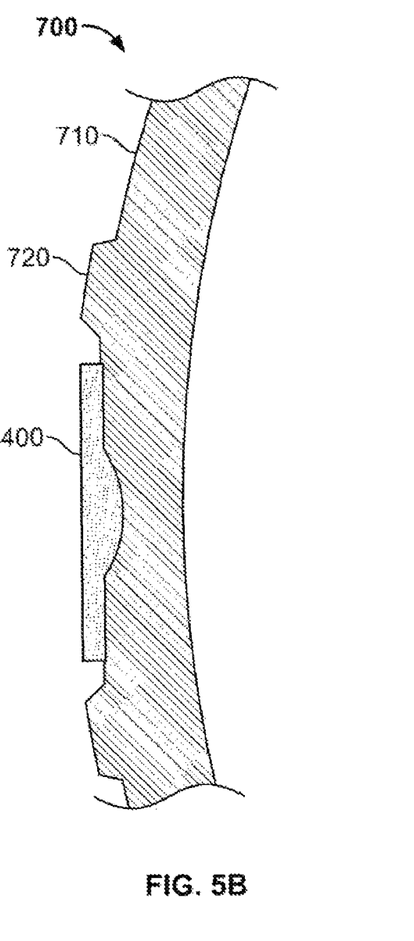
FIG. 5B is a partial side view of one embodiment of a tire having external geometry configured for receiving the object from the tire mold 600.

In an alternative embodiment, the tire is a green tire, and the object is placed in a recess in the mold or on the sidewall, and the tire and object are cured in a vulcanization mold such that the object adheres to the tire. FIGS. 5A-B illustrate an example of this method. It should be understood by those skilled in the art that a green tire is an assembled tire that has not been cured.

FIG. 5A illustrates a partial side view of one embodiment of a tire mold 600 having a sidewall forming portion 610. The sidewall forming portion 610 includes a segment 620 configured to receive the object 400. The mold 600 further includes geometry for forming corresponding features on a tire. For example, mold 600 includes grooves 630 that form corresponding ribs on a tire. Alternative configurations may include recess forming portions, or both grooves and recess forming portions for creating other geometries in a tire for a receiving an object, such as the geometries shown in FIGS. 3-4, or other geometries.

In the illustrated embodiment, the object 400 is retained against the segment 620 in a recess 640. In the illustrated embodiment, a vacuum (not shown) is employed to provide suction through vacuum paths 650 to retain the object 400 against the segment 620. In an alternative embodiment, other mechanical or structural means are used to retain the object 400 against the segment 620. For example, the object 400 may be disposed in a recess, between ribs, between posts, or between retractable grippers. In another alternative embodiment, one or more magnets (not shown) retain the object 400 against the segment 620. In yet another alternative embodiment, suction or electrostatics may be employed to retain the object 400 against the segment.

In an alternative embodiment, the object may be placed on the green tire prior to curing, and the green tire is positioned such that the object aligns with appropriate geometry of the mold. In such an embodiment, adhesive may be employed to affix the object to the green tire. Alternatively, the green tire may be sufficiently tacky, such that adhesive is not required.

In an alternative embodiment (not shown), the mold does not include any special geometry or means for retaining an object. Instead, in one embodiment, the mold is oriented substantially horizontally, and the object may simply be positioned at a desired location on the mold. The object will remain in place due to gravity. In an alternative embodiment, the object may be placed on the green tire prior to curing FIG. 5B illustrates a partial side view of one embodiment of a green tire 700 that is received in the tire mold 600. The green tire 700 includes a sidewall 710. When the green tire 700 is placed in the mold, a portion of the sidewall 710 contacts the object 400. During vulcanization of the green tire 700, the sidewall 710 and the object 400 are cured together such that the object 400 adheres to the sidewall 710. During the vulcanization process, rubber also flows into the grooves 630 of the sidewall forming portion 610 of the mold 600, thereby forming ribs 720 on the sidewall 710 of the tire 700.

Figure 6A:
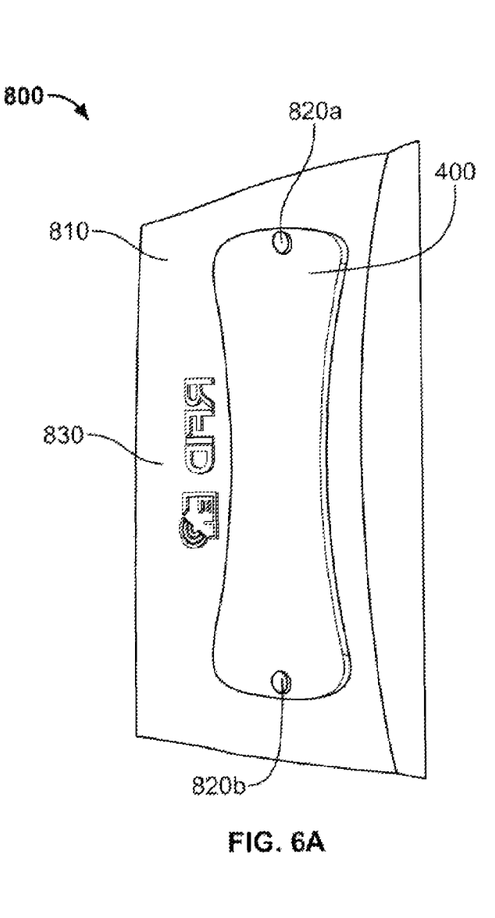
FIG. 6A is a partial side view of an alternative embodiment of a tire mold 800 and an object received by internal geometry of the mold.
Figure 6B:
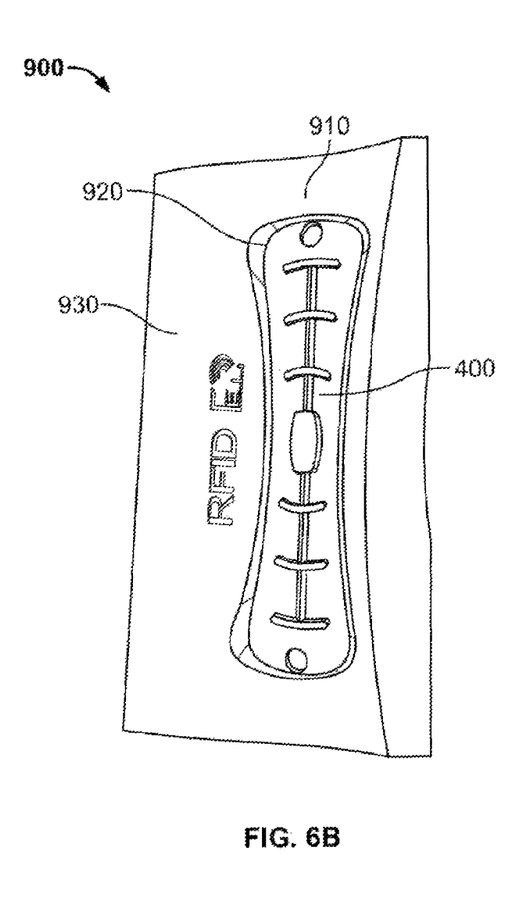
FIG. 6B is a partial side view of an alternative embodiment of a tire that received an object from the tire mold 800 during a vulcanization process.

One specific example of a tire and tire mold is shown in FIGS. 6A-B. FIG. 6A illustrates a partial side view of a tire mold 800 having a sidewall forming portion 810. The sidewall forming portion 810 includes a pair of posts 820a,b configured to be received by slots in the object 400. The posts 820a,b thereby retain the object against a surface of the sidewall forming portion 810. In an alternative embodiment (not shown) the posts may be omitted.

In the illustrated embodiment, the sidewall forming portion 810 further includes indicia forming elements 830. The indicia forming elements 830 imprint corresponding indicia on a tire during the vulcanization process. Such indicia forming elements may be omitted.

FIG. 6B is a partial side view of a tire 900 that received the object 400 from the tire mold 800 during a vulcanization process. As can be seen from this illustration, the tire 900 includes a sidewall 910 with a recess 920 formed therein. The object 400 is disposed in the recess 920 and has been affixed in this position through the curing process. The tire 900 further includes indicia 930 that were formed by the indicia forming elements 830 of the tire mold 800.

It may be desirable for a manufacturer to produce different batches of the same tire model, with different features in the sidewall. For example, a first market may not desire to have an object on a sidewall, a second market may desire to mount an existing object on a tire sidewall, and a third market may desire tires that already have objects mounted on the sidewall. Therefore, in one embodiment of the tire mold, the segment configured to receive the object is a removable segment that can be replaced with an alternative segment.

Figure 7A:
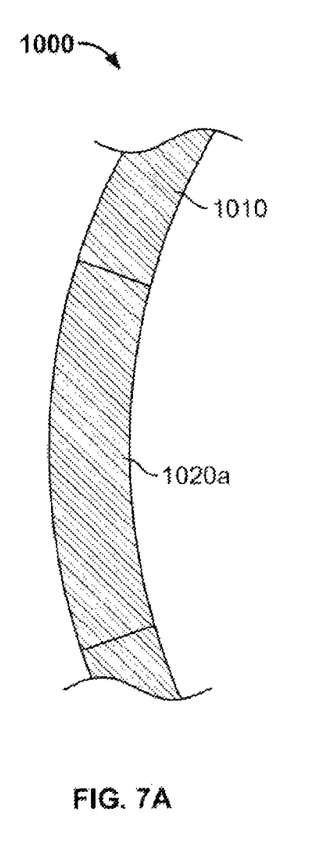
FIGS. 7A-C are a side views of one embodiment of a tire mold that utilizes a plurality of removable segments.
Figure 7B:
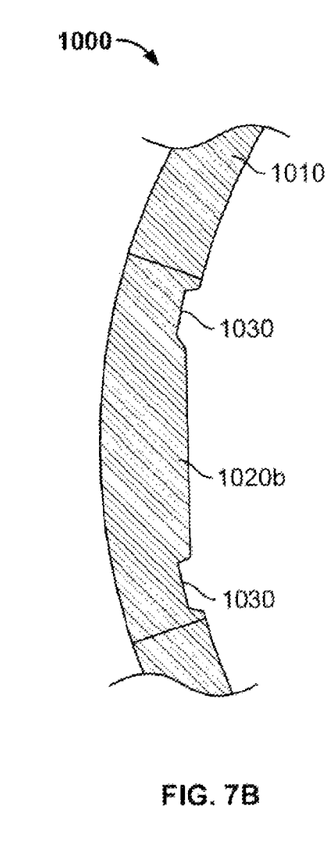
Figure 7C:
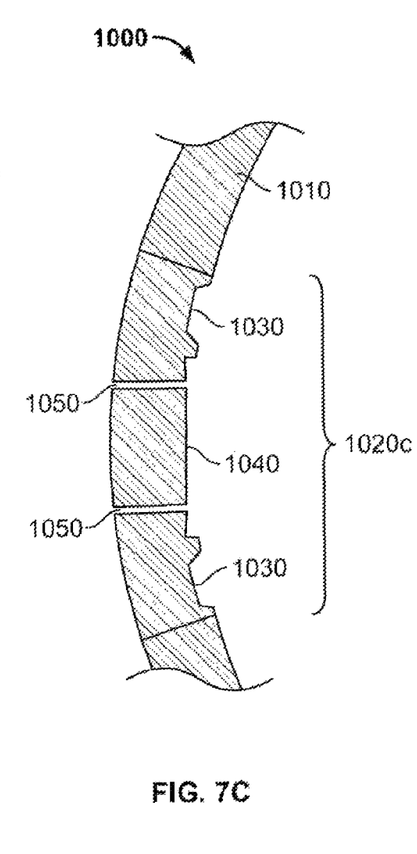

FIGS. 7A-C are side views of one embodiment of a tire mold 1000 that utilizes one of a plurality of removable segments. In each figure, the tire mold 1000 includes a sidewall forming portion 1010 having a removable segment 1020. In a first configuration, shown in FIG. 7A, a first removable segment 1020*a* has a plain face so that no geometric features would be formed on the green tire. In a second configuration, shown in FIG. 7B, a second removable segment 1020*b* includes grooves 1030 configured to form corresponding ribs on a green tire. When the second removable segment 1020*b* is employed, the resulting tire would include geometry configured for receiving an object, such as the tire 100 shown in FIGS. 1-2. Alternative configurations may include recess forming portions, or both grooves and recess forming portions for creating other geometries in a tire for a receiving an object, such as the geometries shown in FIGS. 3-4, or other geometries.

In a third configuration, shown in FIG. 7C, a third removable segment 1020*c* includes grooves 1030 configured to form corresponding ribs on a green tire, and further includes a recess 1040 for receiving an object. The third removable segment further includes vacuum paths 1050 for a vacuum (not shown) to provide suction to retain an object against the segment 1020*c*. Alternatively, other retention means may be employed, such as those described above with reference to FIGS. 5A-B. Additionally, other forming portions may be employed for creating other geometries in a tire for a receiving an object, such as the geometries shown in FIGS. 3-4, or other geometries.

Figure 8A:
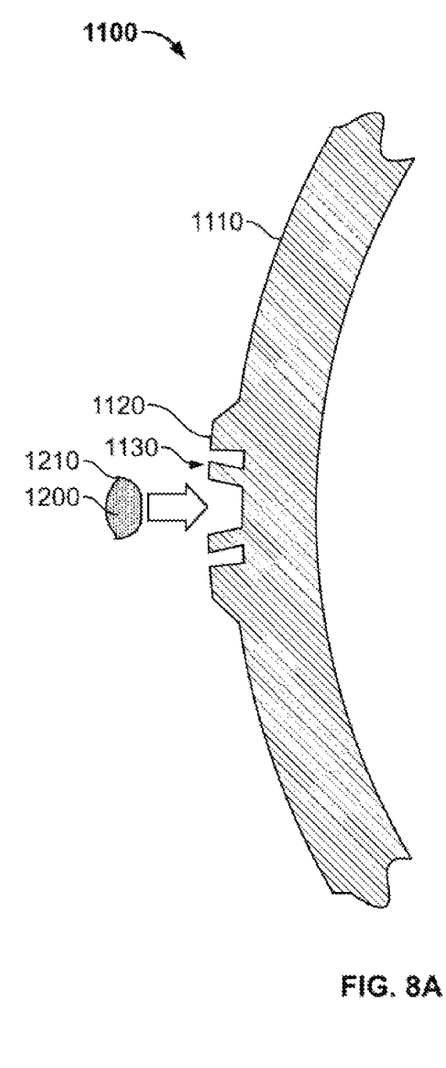
FIGS. 8A-B are side views of an alternative embodiment of a tire having external geometry for receiving an object.
Figure 8B:
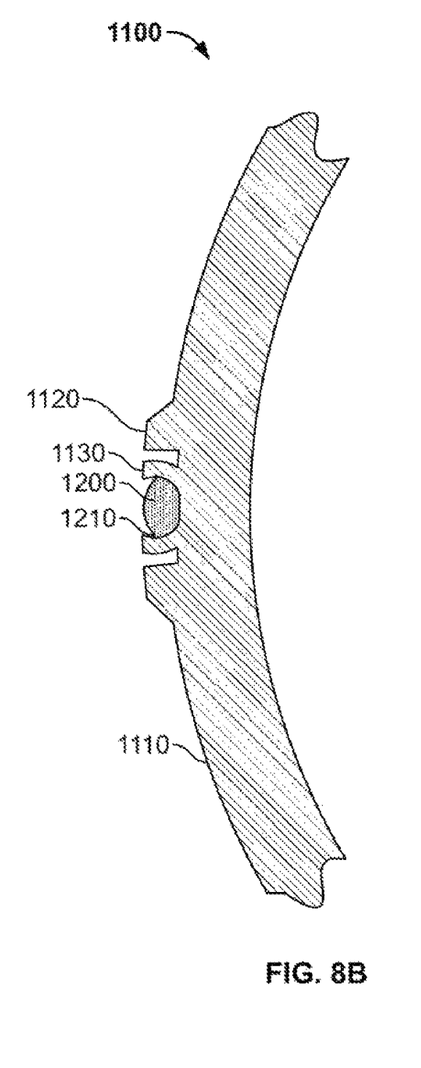

FIGS. 8A-B illustrate side views of an alternative embodiment of a tire 1100 having external geometry for receiving an object 1200. The tire 1100 has a sidewall 1110 with outer ribs 1120 and flexible inner ribs 1130 configured to receive the object. In the illustrated embodiment, the object 1200 includes barbs 1210. The flexible inner ribs 1130 are spaced such that the introduction of the object 1200 causes the flexible inner ribs 1130 to separate. The material properties of the flexible inner ribs 1130 bias them towards each other when separated. The barbs 1210 engage the flexible inner ribs 1130, thereby causing a force fit.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
   a circumferential tread;
   a pair of beads, including a first bead and a second bead;
   a pair of sidewalls, including a first sidewall extending from the first bead to the circumferential tread, and a second sidewall extending from the second bead to the circumferential tread,
   wherein the first sidewall further includes at least one oval-shaped rib at a location between the first bead and the circumferential tread;
   a tire electronic device package mounted to an external side of the first sidewall, such that the tire electronic device package is surrounded by the oval-shaped rib without contacting the oval-shaped rib,
   wherein the tire electronic device package includes a radio frequency identification tag,
   wherein the tire electronic device package is exposed, such that the tire electronic device package is visible, and
   wherein a distance from an equatorial plane of the tire to a point on an outer surface of the oval-shaped rib is at least as great as a distance from the equatorial plane of the tire to a point on an external surface of the tire electronic device package.

2. The tire of claim 1, wherein the tire electronic device package is mounted in a recess of the first sidewall.

3. The tire of claim 2, wherein the oval-shaped rib includes a first portion proximate to a first side of the recess and a second portion proximate to a second side of the recess opposite the first side of the recess.

4. The tire of claim 1, wherein the oval-shaped rib includes a first portion proximate to a first side of the tire electronic device package and a second portion proximate to a second side of the tire electronic device package opposite the first side of the tire electronic device package.

5. The tire of claim 1, wherein the tire electronic device package further includes rubber embedding material.

6. The tire of claim 5, wherein the pair of sidewalls are constructed in part of a rubber material having substantially the same composition as the rubber embedding material.

7. The tire of claim 1, wherein the tire electronic device package further includes indicia that indicates the purpose of the tire electronic device package to a user.

8. A tire comprising:
   a circumferential tread;
   a pair of beads, including a first bead and a second bead;

a pair of sidewalls, including a first sidewall extending from the first bead to the circumferential tread, and a second sidewall extending from the second bead to the circumferential tread,
   wherein the first sidewall further includes at least one rib at a location between the first bead and the circumferential tread, wherein the at least one rib has a substantially oval shape;

a tire electronic device package mounted to an external side of the first sidewall, at a location proximate to the at least one rib, without contacting the at least one rib,
   wherein the tire electronic device package is exposed, such that the tire electronic device package is visible, and
   wherein a distance from an equatorial plane of the tire to a point on an outer surface of the at least one rib is at least as great as a distance from the equatorial plane of the tire to a point on an external surface of the tire electronic device package.

* * * * *